United States Patent [19]

Blomquist et al.

[11] Patent Number: 4,922,954

[45] Date of Patent: May 8, 1990

[54] BI-DIRECTIONAL PRESSURE RELIEF VENT FOR A FUEL TANK

[75] Inventors: James E. Blomquist, Grafton; Robert M. Larson, Mequon, both of Wis.

[73] Assignee: Kelch Corp., Cedarburg, Wis.

[21] Appl. No.: 310,980

[22] Filed: Feb. 14, 1989

Related U.S. Application Data

[63] Continuation-in-part of Ser. No. 164,047, Mar. 4, 1988, abandoned.

[51] Int. Cl.⁵ .............................................. F16K 17/19
[52] U.S. Cl. .................. 137/493; 137/512.4; 220/209
[58] Field of Search .............. 137/493, 493.9, 512.4, 137/854, 859, 860; 220/209

[56] References Cited

U.S. PATENT DOCUMENTS

| 465,013 | 12/1891 | Bourdil | 137/859 X |
| 2,270,332 | 1/1942 | Osborn | 137/854 |
| 3,430,648 | 3/1969 | Botkin | 137/493 |

FOREIGN PATENT DOCUMENTS

| 2501228 | 7/1975 | Fed. Rep. of Germany | 137/493 |
| 535467 | 4/1941 | United Kingdom | 137/493 |
| 1000398 | 8/1965 | United Kingdom | 137/493 |

Primary Examiner—Robert G. Nilson
Attorney, Agent, or Firm—Quarles & Brady

[57] ABSTRACT

A bi-directional vent for a fuel tank utilizes a resilient sealing member which in its unflexed state is a simple resilient washer. The sealing member is disposed inside a vent body, and forms both an inner and outer seal. The inner seal is formed between an inner circumferential edge on a central hole in the washer and a conical sealing surface attached to the vent body. The outer seal is formed between an outer annular sealing surface on the washer and a circumferential edge formed on a central opening in the vent body. Increased pressure in the tank causes the sealing member to deflect at its inner portion away from the circumferential edge on the vent body, resulting in outward venting. Reduced pressure in the tank causes the outer part of the sealing member to deflect away from the conical seating surface, resulting in inward venting.

1 Claim, 2 Drawing Sheets

BI-DIRECTIONAL PRESSURE RELIEF VENT FOR A FUEL TANK

CROSS REFERENCE

This application is a continuation-in-part of U.S. patent application Ser. No. 07/164,047, filed Mar. 4, 1988.

BACKGROUND OF THE INVENTION

The invention relates to fuel tanks, and more particularly to fuel tank vents which permit a bi-directional equalization of pressure between the interior and exterior of the tank.

Fuels contained in tanks (and their vapors) undergo substantial thermal expansion. Because of the explosive nature of fuels, it is standard practice to provide some means of preventing an excessive buildup of pressure inside fuel tanks. Continuous, open venting of a fuel tank (such as a tank found on a lawn mower) is undesirable due to the potential for loss of fuel by evaporation, the discharge of noxious, explosive, and environmentally harmful vapors into the atmosphere, and the danger of spillage. Therefore, check valves are typically used to allow venting only above a threshold pressure.

A related problem is that as fuel is used (or as cooling occurs after venting) a partial vacuum can be created in the tank. If the vacuum becomes too great, engine performance can be affected. Thus, a need also exists to bleed air back into the tank at certain times.

Bi-directional fuel tank vents were therefore developed. These valves allow for substantial equalization of pressure in both directions during abnormal conditions, while otherwise maintaining the tank sealed. In operation, the bi-directional vent is normally closed, preventing escape of the vapors inside the tank. If the pressure inside the tank rises, for example due to thermal expansion, then the bi-directional vent allows just enough gas out of the tank to reduce pressure to the threshold differential. If the pressure inside the tank falls, then air is admitted into the tank to reduce the differential to the threshold differential. In both directions, a small pressure differential is required to initiate the venting action. Below that pressure differential, the vent is closed and the tank remains sealed.

While prior bi-directional vents are generally satisfactory, they typically require relatively expensive and complex seals. One common type of prior bi-directional vent incorporates a duck bill type seal for providing venting in one direction only, usually into the tank. In that case a second check valve, usually formed around the rim of the vent, is used to provide venting in the other direction. In the case of the duck bill seal, the seal lips may become jammed by debris, thereby compromising their effectiveness. Further, some such vents are susceptible to leakage when the tank is tipped over (e.g. a snow blower falls on its side).

Thus, a need has existed for a bi-directional valve which uses a seal that is inexpensive to produce, which has a self-cleaning mechanism, and which is resistant to fuel leakage when the tank is tipped over accidently.

SUMMARY OF THE INVENTION

The invention provides a bi-directional vent for a fuel tank. There is a vent body having an opening therethrough with a circumferential edge. The vent body also includes a conical seating surface supported centrally in the opening.

A resilient washer-like sealing member is also provided. It has a first side with an outer annular seating surface, a second opposite side, and a central hole with an inner circumferential edge. The sealing member is positioned such that the inner circumferential edge of the sealing member contacts the conical seating surface to form a first seal and the circumferential edge of the vent body opening contacts the outer annular seating surface of the resilient sealing member to form a second seal.

A first pressure differential of a first polarity between opposite sides of the sealing member can open the first seal by forcing the inner circumferential edge of the resilient sealing member away from the conical seating surface, so as to permit gaseous flow through the opening of the vent body in a first direction (e.g. into the tank), so as to reduce to magnitude of the first pressure differential.

A second pressure differential of a second, opposite polarity can open the second seal by forcing the outer annular seating surface of the resilient sealing member to deflect away from the circumferential edge of the vent body opening, so as to permit gaseous flow through the opening of the vent body in a second direction (e.g. out of the tank), thereby reducing the magnitude of the second pressure differential.

In the absence of a pressure differential between the opposite sides of the resilient sealing member, the first and second seals remain closed.

In one preferred embodiment, the conical seating surface is formed on the end of a support member that projects downward from the top of the vent.

In another preferred form, an inner support member is included, and the conical seating surface is formed on an end of the inner support member that projects upwards towards the top of the vent. In the second preferred form, the directions of gaseous flow through the first and second seals are reversed, such that the first seal permits venting out of the tank, and the second seal permits venting into the tank.

A principal advantage of this invention is the utilization of a simple resilient washer to achieve bidirectional venting. The washer is simple to produce, eliminating the need for complex, expensive duckbill seals. Also, the conical seat provides a floating, self-cleaning feature to minimize sticking.

The foregoing and other objects and advantages of the invention will appear from the following description. In the description, reference is made to the accompanying drawings which form a part hereof, and in which there is shown by way of illustration preferred embodiments of the invention. Such embodiments do not necessarily represent the full scope of the invention, and reference is made therefore to the claims herein for interpreting the scope of the invention.

DESCRIPTION OF THE PREFERRED EMBODIMENT

Figure 1:
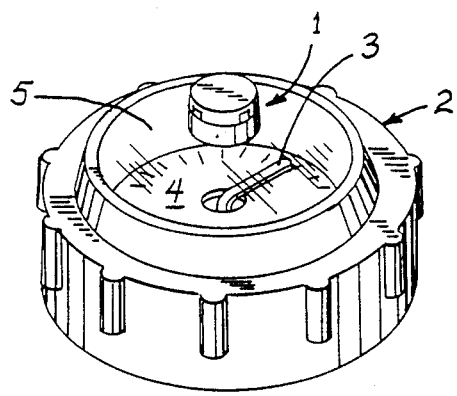
FIG. 1 is a perspective view of a fuel tank gauge which incorporates a bi-directional pressure relief vent of this invention.

Referring to FIG. 1, while a bi-directional fuel tank vent 1 of this invention may be located anywhere on the tank (not shown), a preferred location is atop a gauge/cap assembly 2. The tank cover assembly 2 is typically threaded onto a mating mouth (not shown) on the tank. The tank cover assembly 2 also usually includes an integral float operated fuel sensor (not shown), as is well known in the art.

As shown, the gauge includes an indicating pointer 3 which extends through the center of a base plate 4. The plate 4 is marked with indicia relating the position of the pointer 3 to the quantity of fuel in the tank. There is also a clear dome shaped cover 5, referred to in the art as a crystal 5. The crystal 5 allows viewing of the pointer 3 against the base plate 4 while at the same time keeping the tank cover assembly substantially sealed.

A preferred placement for the vent 1 in this embodiment is in the center of the crystal 5 at its apex. In that way, the hole in the base plate 4 is concealed while allowing full view of the position of the pointer 3. The base plate 4 is not a sealing member. The vapors inside the tank may freely pass to the area between the base plate 4 and the crystal 5. As a result, the vent 1 is effectively coupled to the tank atmosphere when the tank cover assembly 2 is in place.

Figure 2:
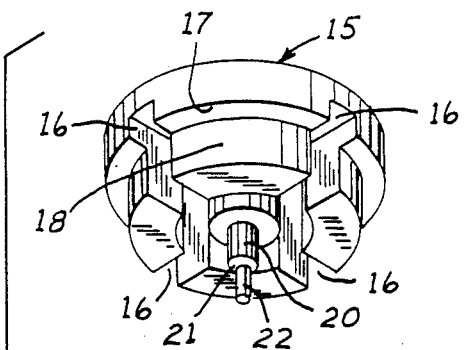
FIG. 2 is a detailed, exploded view of the vent portion of the gauge of FIG. 1.
Figure 2:
Figure 3:
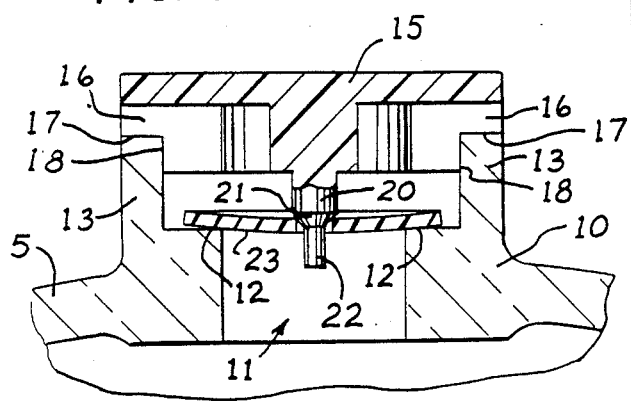
FIG. 3 is a detailed vertical sectional view of the vent of FIG. 1 with the vent in the equilibrium condition.

Referring now to FIGS. 2 and 3, the vent 1 has a vent body 10 which is formed as an integral part of the crystal 5. The crystal 5 is a moulded plastic part easily formed by processes well known in the art. The vent body 10 can include a central aperture 11 and an annular ridge, or seat which defines a circumferential edge 12. Wall 13 on the vent body 10 supports a cap 15. The cap 15 is also formed of plastic material and is preferably opaque to provide an aesthetically pleasing appearance as a button on top of the crystal 5.

The cap 5 contains channels 16 formed by radial grooves which are cut into bottom and side surfaces 17 and 18, respectively, of the cap 5. Surfaces 17 and 18 mate with the wall 13 of the vent body 10. The channels 16 permit the free passage of air from outside of the vent 1 to the interior of the vent 1 just beneath the cap 15. The cap 15 is secured onto the vent body 10 by bonding the mating surfaces, for example, by adhesives or sonic welding.

The cap 15 also includes a center post or stem 20. The center post 20 includes a downwardly facing conical seating surface 21, which tapers down to a cylindrical tip portion 22. The conical seating surface 21 is just above the circumferential edge 12 when the cap 15 is installed on the vent body 10.

Sealing is accomplished by a resilient sealing member 23. In its normal, unflexed state, the sealing member 23 is in the form of a flat, annular washer. The sealing member includes an inner hole which defines an inner circumferential edge. During assembly of the vent 1, the sealing member 23 is positioned with the outer annular portion of the sealing member 23 overlapping the circumferential edge 12 on the vent body, and with the inner circumferential edge of the sealing member 23 in contact with the conical seating surface 21. The diameter of the base of the conical seating surface 21 is greater than the diameter of the center hole of the resilient sealing member 23, so that contact with the conical seating surface 21 urges the washer 23 against the circumferential edge 12 of the vent body.

The sealing member 23 thereby subdivides the vent 1 into two chambers on either side of the sealing member 23. Above the sealing member 23, the vent 1 freely communicates with the outside atmosphere via channels 16. Below the sealing member 23, the vent 1 is exposed to the interior of the tank via throughbore 11. FIG. 3 is shown in a condition where the pressure inside the tank is approximately equal to that of the outside atmosphere. Under those conditions, the resilient sealing member 23 is in contact with both the circumferential edge 12 of the vent body and the conical seating surface 21, sealing the tank against exchange of gasses with the outside atmosphere.

Figure 4:
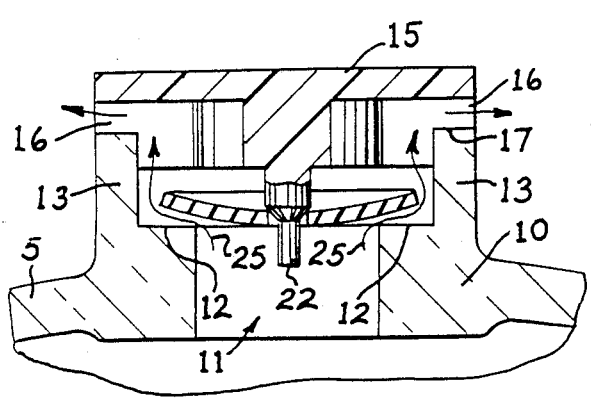
FIG. 4 is a view similar to FIG. 3, except with the vent in the outflow condition.
Figure 6:
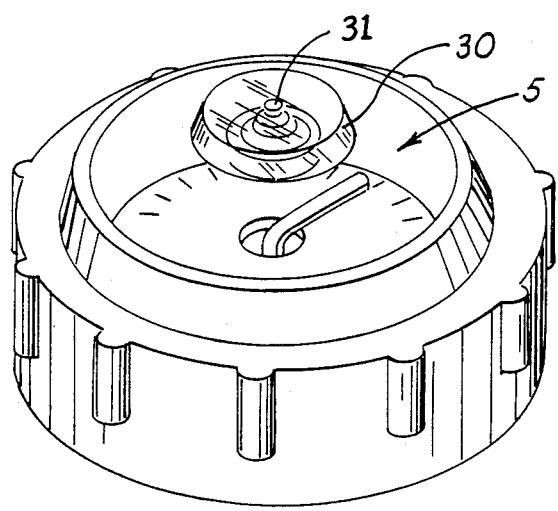
FIG. 6 is a perspective view of a fuel tank gauge which incorporates a second embodiment for a bi-directional pressure relief vent of this invention.
Figure 7:
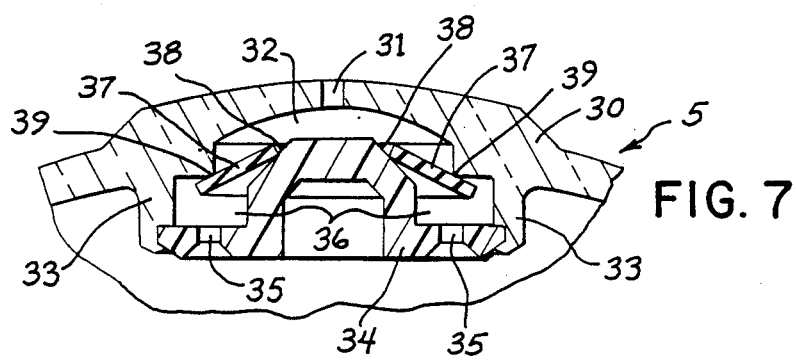
FIG. 7 is a detailed vertical sectional view of the vent of FIG. 6 with the vent in the equilibrium condition.

If the interior tank pressure rises above a threshold level, as shown in FIG. 4, the outer circumference of the resilient sealing member 23 deflects away from the circumferential edge 12 of the vent body, allowing the venting of the excess pressure out the channels 16 into the outside atmosphere as shown by arrows 25. Note that only a small amount of gas is allowed to escape, just enough to reduce pressure inside the tank to the threshold level. The resilient sealing member 23 then relaxes to its closed position (FIG. 3), and the tank is again sealed.

Figure 5:
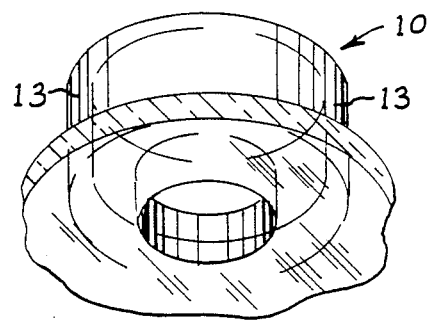
FIG. 5 is a view similar to FIG. 3, except with the vent in the inflow condition.

Referring to FIG. 5, when the tank pressure falls, the inner portion of the resilient sealing member 23 near the center hole is sucked downward, away from contact with the conical seating surface 21. The center hole of the sealing member 23 is slightly larger than the tip portion 22 of the tip portion 22 to form a loose fit thereon. When contact with the conical seating surface 21 is broken, air is admitted through the space between the center hole of resilient sealing member 23 and the tip 22, and into the tank interior as shown by arrows 26. Again, when the threshold differential has been restored, the washer 23 reverts to the normal sealed position as in FIG. 3.

In both venting out (FIG. 4) and venting in (FIG. 5), a small pressure differential, referred to as preload, must be overcome to initiate the venting action. The vent 1 is therefore normally sealed, as in FIG. 3, within a small range of pressure differential near equilibrium.

Referring to FIGS. 6-9, a second embodiment of the invention also comprises a vent body 30 integrally formed with the crystal 5. In this embodiment, the vent includes a hole 31 in the top center of the crystal 30 for providing free exchange of air between a first internal chamber 32 and the atmosphere outside the crystal 30. The wall of the first internal chamber terminates in an outward annular ridge which defines a circumferential edge 39.

On the interior, or underside, of the crystal 30, a cylindrical wall 33 projects downward for supporting an inner support member 34. The inner support member 34 is preferably spun onto a mating groove in the cylindrical wall 33. The inner support member includes a conical seating surface projecting upward towards the top of the vent, and surrounded by the circumferential edge 39 of the vent body. The inner support member 34 also includes holes, or air passages 35, for permitting the free exchange of air through the inner support member 34 to a second chamber 36.

Between chambers 32 and 36 there is interposed a resilient sealing member 37. As in the first embodiment above, the sealing member 37 is a resilient annular washer in its normal, or unflexed state, with a central hole defining an inner circumferential edge, and an outer annular seating surface. Once in place, the sealing member 37 forms a first, or inner seal by contact between the inner circumferential edge of the sealing member with the conical seating surface 38 of the inner support member 34, and a second seal by contact between the annular seating surface on the sealing member with the circumferential edge 39 formed on the crystal 30.

Figure 8:
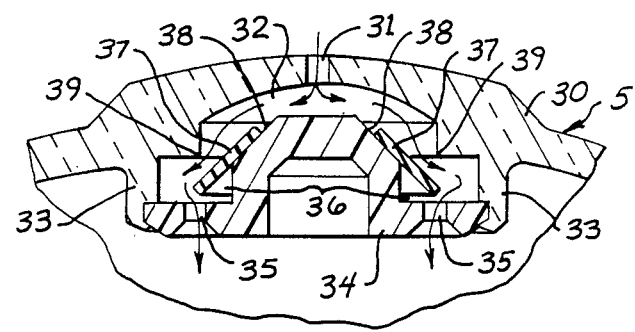
FIG. 8 is a view similar to FIG. 7, except with the vent in the inflow condition.
Figure 9:
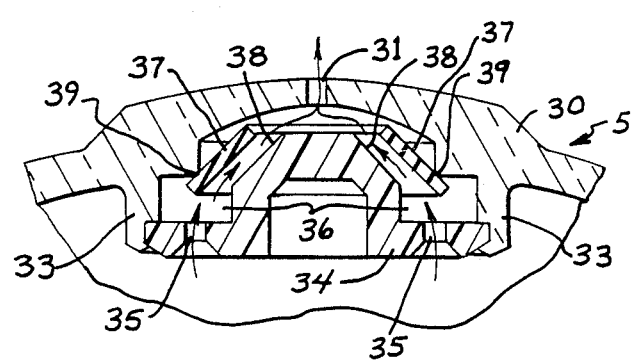
FIG. 9 is a view similar to FIG. 7, except with the vent in the outflow condition.

The sealing member 37 is placed into the vent body prior to spinning the inner support member 34 into place. When the inner support member is spun on, the conical seating surface 38 extends beyond the circumferential edge 39 of the vent body, and so distends the sealing member 37 to the position shown in FIG. 7, assuming that there is no pressure differential across the vent, e.g. equilibrium. In FIG. 8, the vent is shown in an inward venting position in which the sealing member 37 is deflected away from second seat 39, e.g. by a partial vacuum inside the tank. Similarly, FIG. 9 shows the vent in an outward venting position, in which the tank has excess pressure, causing the sealing member 37 to deflect away from conical seating surface 38. Note that the views of FIGS. 8 and 9 are exaggerated in that the actual amount of deflection under normal rates of pressure change would be barely perceptible; just enough to allow seepage until the internal to external pressure differential is below the preload value.

In both of the above described embodiments, a first or inner seal is formed between the inner circumferential edge of a resilient sealing member and a conical seating surface. That structure is an important aspect of this invention because it provides an area of contact between the sealing member and seating surface which is essentially an annular line, or ring around seat defined by the ridge, or corner of the inner circumferential edge on sealing member. As with the inner seal, the outer seals for both embodiments are similarly advantageous in that the contact area between the outer annular seating surface of sealing member and the circumferential edge on the vent body is an annular line, or ring defined by the corner of the circumferential edge on the vent body.

Several important aspects of the invention can now be described. First of all, minimal contact area is provided by both the inner and outer seals, e.g. essentially an annular line of contact. Due to the small contact area, the applied tension due to flexure of the resilient sealing member has a greater force per unit area, or "bite" at the seal. As a result, a relatively large static preload pressure is necessary to initiate venting, which in turn allows the vent to remain sealed, for example, if the tank on which it is used is overturned sideways.

A second benefit of the reduced seal contact area is that the resulting seals are highly resistant to entrapment of contamination. Small foreign particles may be admitted through the small vent openings which may work their way into the seals. But because of the minimal contact area provided by this invention, such contamination tends to pass through the sealing surface rather than be entrapped by it. In other words, the vent accordingly to the invention is essentially "self cleaning" and highly resistant to being clogged in an open position.

Another advantage of the above described structures is that because of the conical seating surface, the sealing member is essentially self centering thereon. If displaced off center, the greater tension on the higher side of resilient sealing member will tend to "work" the sealing member 37 back towards a central position. Therefore, it is not necessary with the present invention to provide other auxiliary means such as, for example, guide slots, channels, or cavities, for holding the sealing member in an operable position. The tip portion 22 in the first embodiment of FIGS. 1-5 is merely a convenience for maintaining the sealing member captive during installation and shipping. In operation, the tip 22 is not used at all. The embodiment of FIGS. 6-9 holds the sealing member captive between the vent body and the inner support member, so that a tip portion is not necessary. In either case, once the vent is in operation, the sealing member will tend to automatically "right" itself in the center of the conical seating surface and remain there.

It should be obvious to one skilled in the art that numerous modification may be made to the above described embodiments within the scope of this invention. For example, the terms center or central should not be read to require that the hole be exactly at the center. Further, the term circumferential should not be read to require exactly round structure.

What is claimed:

1. A bi-directional vent for a fuel tank comprising:
    a vent body having an opening therethrough with a circumferential edge and having a conical seating surface supported centrally in the opening by an inner support member, the conical seating surface being formed on an end of the inner support member that projects upwards towards the top of the vent; and
    a resilient washer-like sealing member having a first side with an outer annular seating surface, a second opposite side, and a central hole with an inner circumferential edge, the resilient sealing member being positioned such that the inner circumferential edge of the resilient sealing member contacts the conical seating surface to form a first seal and the circumferential edge of the vent body opening contacts the outer annular seating surface of the resilient sealing member to form a second seal;
    whereby a first pressure differential of a first polarity between opposite sides of the resilient sealing member can open the first seal by forcing the inner circumferential edge of the resilient sealing member away from the conical seating surface, so as to permit gaseous flow through the opening of the vent body in a first direction, so as to reduce to magnitude of the first pressure differential;
    whereby a second pressure differential of a second polarity which is opposite to the first polarity between said opposite sides of the resilient sealing member can open the second seal by forcing the outer annular seating surface of the resilient sealing member to deflect away from the circumferential edge of the vent body opening, so as to permit gaseous flow through the opening of the vent body in a second direction, thereby reducing the magnitude of the second pressure differential; and
    whereby in the absence of a pressure differential between said opposite sides of the resilient sealing member, the first and second seals remain closed.

* * * * *